UNITED STATES PATENT OFFICE.

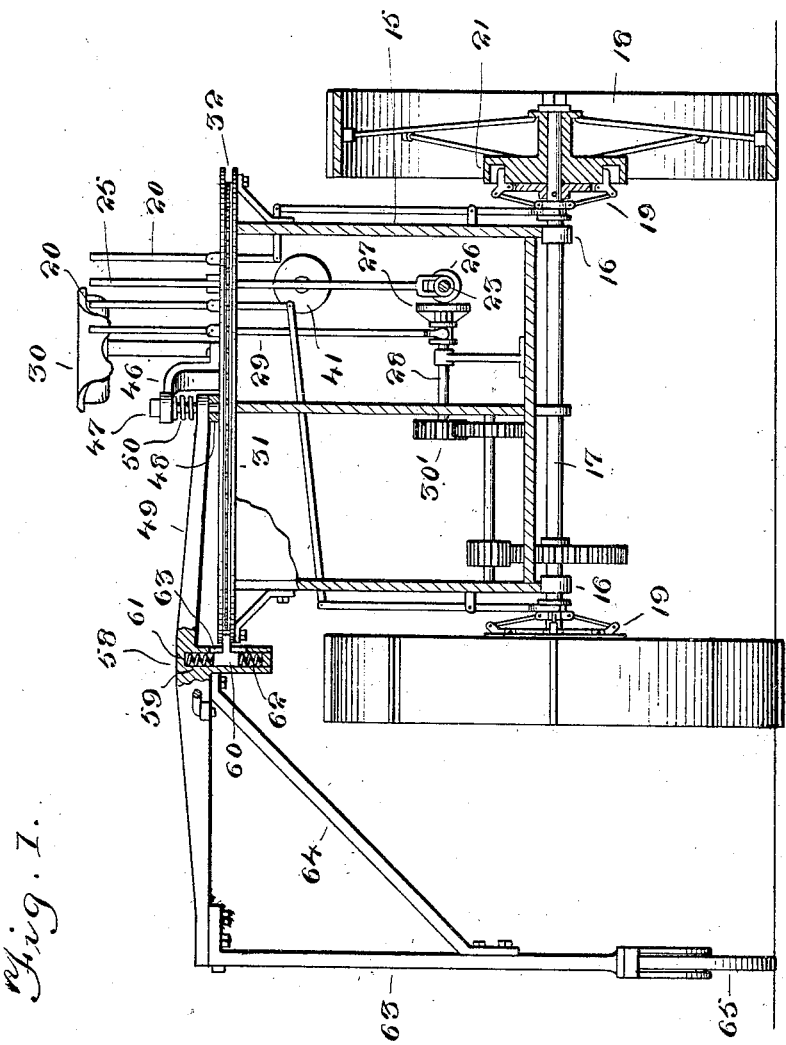

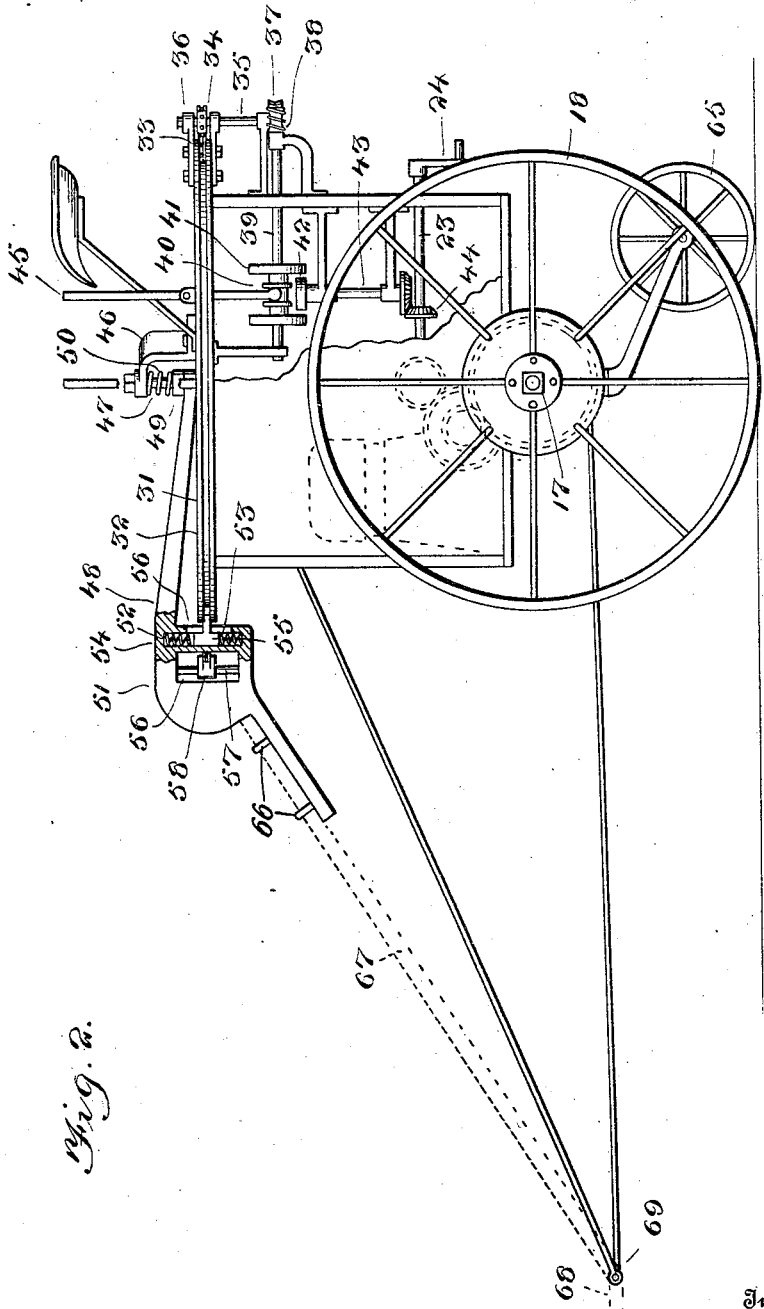

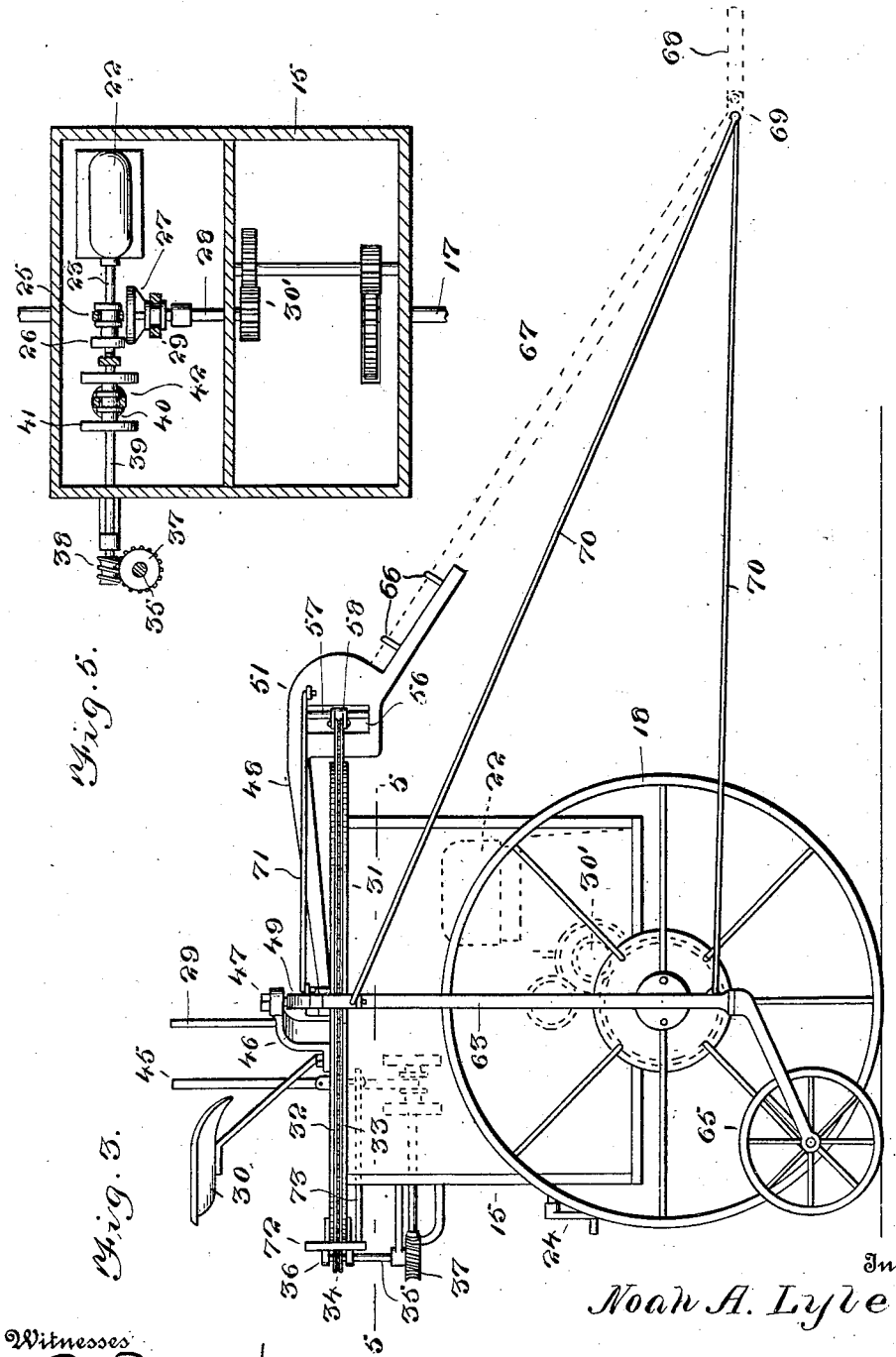

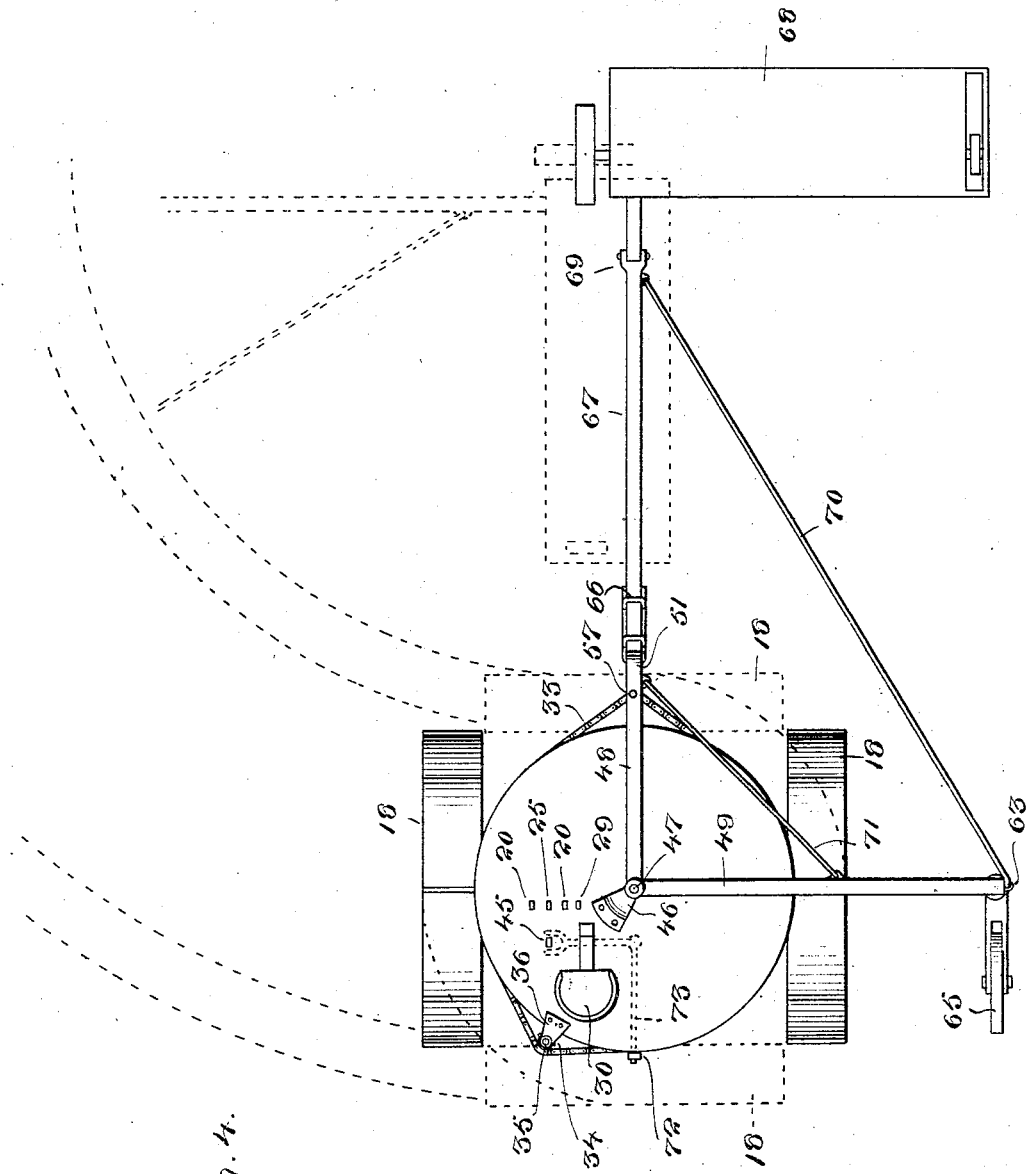

NOAH A. LYLE, OF BANCROFT, IDAHO.

TRACTION-ENGINE.

1,171,732.   Specification of Letters Patent.   Patented Feb. 15, 1916.

Application filed June 29, 1915. Serial No. 36,982.

*To all whom it may concern:*

Be it known that I, NOAH A. LYLE, a citizen of the United States, residing at Bancroft, in the county of Bannock and State of Idaho, have invented new and useful Improvements in Traction-Engines, of which the following is a specification.

This invention relates to traction engines, and it has for its object to produce a tractor of simple and improved construction which will be particularly adapted for the purpose of pushing agricultural machines, such as harvesters and headers that require to be pushed over the field.

A further object of the invention is to produce a tractor of the character described which will be equipped with simple and effective means for steering the same and the machine pushed thereby, and also for turning sharp corners when required.

A further object of the invention is to produce a machine of the character described which will be equipped with a push bar and a stabilizer and with steering gear of simple and improved construction.

With these and other ends in view which will readily appear as the nature of the invention is better understood, the same consists in the improved construction and combination and arrangement of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a front elevation of a tractor constructed in accordance with the invention. Fig. 2 is a side elevation with parts of the frame or casing broken away. Fig. 3 is a side elevation of the machine as seen from the opposite side to Fig. 2, parts of the frame or casing being also broken away. Fig. 4 is a top plan view of the machine showing the different positions occupied in turning a sharp corner. Fig. 5 is a sectional view taken on the line 5—5 in Fig. 3.

Corresponding parts in the several figures are denoted by like characters of reference.

The frame 15 of the improved tractor is provided with bearings 16 for the axle 17 having the ground wheels 18, said ground wheels being capable of being connected with the axle for rotation therewith by means of friction clutches 19 which are independently operable by hand levers 20 which are suitably connected therewith. One or both of said ground wheels may thus be disconnected from the axle for convenience in turning or otherwise manipulating the machine. The wheels are provided with overhanging caps or rims 21 forming housings or protectors to prevent dirt from entering the mechanism of the friction clutches.

The frame or casing 15 supports an internal combustion motor 22 of conventional construction having a crank shaft 23 equipped with a starting crank 24. For controlling the engine a speed lever 25 and suitable connections are provided. The driven shaft 23 carries a friction wheel 26 engaging a friction disk 27 on a counter shaft 28, said friction disk being controlled by a lever 29. It will be understood that the several controlling levers are to be mounted in position convenient to the operator whose seat 30 is supported on the frame of the machine. The shaft 28 carrying the friction disk 27 is connected by a train of gears 30' with the axle 17 to which rotary motion will thus be transmitted.

The frame of the machine supports a circular top member 31 having a circumferential annular groove 32. Guided in the groove 32 is a chain 33 which is also trained over a sprocket wheel 34 on a shaft 35 which is mounted for rotation in brackets 36 that are rigidly connected with the frame structure. The shaft 35 carries a worm gear 37 meshing with a worm 38 on a shaft 39, the latter being equipped with a sleeve 40 carrying friction disks 41, either one of which may be placed in engagement with a friction wheel 42 on a driven shaft 43 which receives motion from the engine shaft 23 through the medium of intermeshing bevel gears 44. A hand lever 45 and suitable connections are employed for adjusting the sleeve 40 carrying the friction disks 41 to a neutral position with respect to the friction wheel 42, thereby interrupting transmission of motion to the worm gear 37, or for placing one or the other of the friction disks 41 in engagement with the friction wheel 42 for the purpose of transmitting motion in the desired direction to the worm gear.

The top member 31 is provided with a bracket 46 affording a bearing for one end of a king bolt 47 which extends centrally through the top member 31 and on which two radial arms, namely, the push arm 48 and the stabilizer arm 49 are pivotally mounted, said arms being pressed in a downward direction by a spring 50 coiled about the king bolt. The push arm is provided with a head 51 having a recess 52 in which a guide lug 53 is mounted between two coiled springs 54, 55, one above and the other below said guide lug, which latter extends through a slot 56 in the head 51 in engagement with the annular groove 32 of the top member 31. The head 51 has a second recess 56 wherein is mounted a vertical rod or shaft 57 carrying a sleeve 58 with which the two ends of the steering chain 33 are connected. It will be seen that owing to the construction described, the push arm 48 is capable of such rocking motion with respect to the frame structure of the machine as will be caused by irregularities in the surface of the ground over which the tractor and the machine pushed thereby may happen to pass, all shocks being taken up by the shock absorbing springs 50, 54 and 55, and it being, of course, understood that the pivotal connection of the push arm with the king bolt is sufficiently loose to permit such limited rocking movement.

The stabilizer arm 49 is provided with a head 58 having a recess 59 wherein is mounted a lug or slide 60, said slide being interposed between two springs 61, 62 and extending through a slot 63 in engagement with the annular groove 32 for the purpose of permitting rocking movement of the stabilizing arm with respect to the frame in the same manner as the push arm previously described. The arm 49 extends beyond the head 58 and is provided with a downwardly extending leg 63 reinforced by a brace 64 and carrying at its lower end a ground engaging caster wheel 65 to assist in guiding the machine. The push arm 48 is connected by bolts or clips 66 with the push bar 67 of the machine that is to be pushed, said push bar being connected with the frame of such machine which is indicated at 68 by a flexible joint 69. Brace rods 70 connect the joint 69 with the stabilizing device adjacent to the upper and lower ends of the limb 63. A brace 71 connects the stabilizing arm 49 with the push arm 48, thus maintaining said arms at substantially a right angle to one another.

Pivotally connected with the frame of the machine is a lug or arm 72, said lug being disposed in the path of the stabilizing arm 49 when the machine is turned. A suitable connection is provided, as seen at 73, between the lug or arm 72 and the sleeve 40 carrying the friction disks 41, whereby when the lug 72 is engaged by the stabilizing arm, the sleeve will be moved along the shaft 39 until the disks 41 are placed in a neutral position with respect to the friction wheel 42, thereby interrupting the transmission of motion to the steering gear.

From the foregoing description, taken in connection with the drawings hereto annexed, the operation and advantages of this invention will be readily understood by those skilled in the art to which it appertains. The worm 38 and the worm gear 37 constitute a locking device, whereby the steering mechanism will be retained in adjusted position, thereby preventing the ground wheels from swerving from the course in which they are directed. By manipulating the steering lever motion in any direction may be transmitted to the worm gear 37 on the shaft 35 carrying the sprocket wheel 44 whereby the chain 33 is driven, thereby causing the entire frame of the machine to be turned about the axis of the king bolt 47, the push arm, as well as the stabilizing device, being maintained in position by being connected with the machine that is being pushed by the tractor. In turning square corners at the end of the field or in the road the frame of the machine will make a quarter-turn on the completion of which the lug or lever arm 72 will be engaged by the stabilizing arm, thereby throwing the friction transmission to the worm wheel 37 out of gear, and preventing straining or injury to the transmission chain 33. The improved machine is simple in construction, easily manipulated and capable of being manufactured at a moderate expense.

Having thus described the invention, what is claimed as new, is:—

1. In a push tractor, a wheel supported motor driven frame having a top member, a king bolt extending axially through said top member, and two arms pivoted on the king bolt, said arms constituting, respectively, a push bar and a stabilizing bar.

2. In a push tractor, a wheel supported motor driven frame having a top member, a king bolt extending axially through said top member, and two arms pivoted on the king bolt, said arms constituting, respectively, a push bar and a stabilizing bar, said stabilizing bar having a downwardly extending limb and a caster wheel carried thereby.

3. In a push tractor, a wheel supported motor propelled frame having a top member, a king bolt extending axially through said top member, a push bar and a stabilizing bar pivoted on the king bolt, and springs above and below said push bar and stabilizing bar.

4. In a push tractor, a wheel supported motor propellel frame having a top member, a king bolt extending axially through the top member, a bracket on the top member supporting the upper end of the king bolt, springs on the king bolt between the bracket and the top member, and a push bar and a stabilizing bar pivoted on the king bolt between the springs.

5. In a push tractor, a wheel supported motor propelled frame having a circular top member provided with an annular groove, a king bolt extending axially through the top member, arms pivoted on the king bolt and constituting, respectively, a push bar and a stabilizing bar, the latter having a downwardly extending limb carrying a ground engaging caster wheel, a brace connecting the arms and maintaining them in angular relation, slidable resiliently supported lugs connected with the respective arms and engaging the annular groove in the top member, a chain guided in the annular groove and having its ends connected with one of the arms, a vertical shaft supported for rotation on the frame and carrying a driving sprocket over which the chain is guided, and means for driving the sprocket carrying shaft including a worm gear.

6. In a push tractor, a wheel supported motor propelled frame having a circular top member provided with an annular groove, a king bolt extending axially through the top member, arms pivoted on the king bolt and constituting, respectively, a push bar and a stabilizing bar, the latter having a downwardly extending limb carrying a ground engaging caster wheel, a brace connecting the arms and maintaining them in angular relation, slidable resiliently supported lugs connected with the respective arms and engaging the annular groove in the top member, a chain guided in the annular groove and having its ends connected with one of the arms, a vertical shaft supported for rotation on the frame and carrying a driving sprocket over which the chain is guided, and means for driving the sprocket carrying shaft including a worm gear and means for transmitting motion to said worm gear from the propulsion motor.

7. In a push tractor, a wheel supported motor propelled frame having a circular top member provided with a circumferential groove, a king bolt extending axially through the top member, arms pivoted on the king bolt, said arms constituting, respectively, a propulsion bar and a stabilizing bar, the latter having a downwardly extending limb carrying a ground engaging caster wheel, means for connecting the arms and spacing them apart in angular relation, a member guided on one of the arms for vertical slidable movement, a steering chain guided in the circumferential groove of the top member and having its ends connected with the vertically slidable member, means actuated by the propulsion motor for driving the chain, and means for reversing the driving motion.

8. In a push tractor, a wheel supported motor propelled frame having a circular top member provided with a circumferential groove, a king bolt extending axially through the top member, arms pivoted on the king bolt, said arms constituting, respectively, a propulsion bar and a stabilizing bar, the latter having a downwardly extending limb carrying a ground engaging caster wheel, means for connecting the arms and spacing them apart in angular relation, a member guided on one of the arms for vertical slidable movement, a steering chain guided in the circumferential groove of the top member and having its ends connected with the vertically slidable member, means actuated by the propulsion motor for driving the chain, means for reversing the driving motion, and means for automatically interrupting the transmission of motion to the steering chain.

In testimony whereof I affix my signature in presence of two witnesses.

NOAH A. LYLE.

Witnesses:
B. L. CHISM,
JOHN L. BAKER.

Copies of this patent may be obtained for five cents each, by addressing the "Commissioner of Patents, Washington, D. C."